United States Patent Office 3,712,841
Patented Jan. 23, 1973

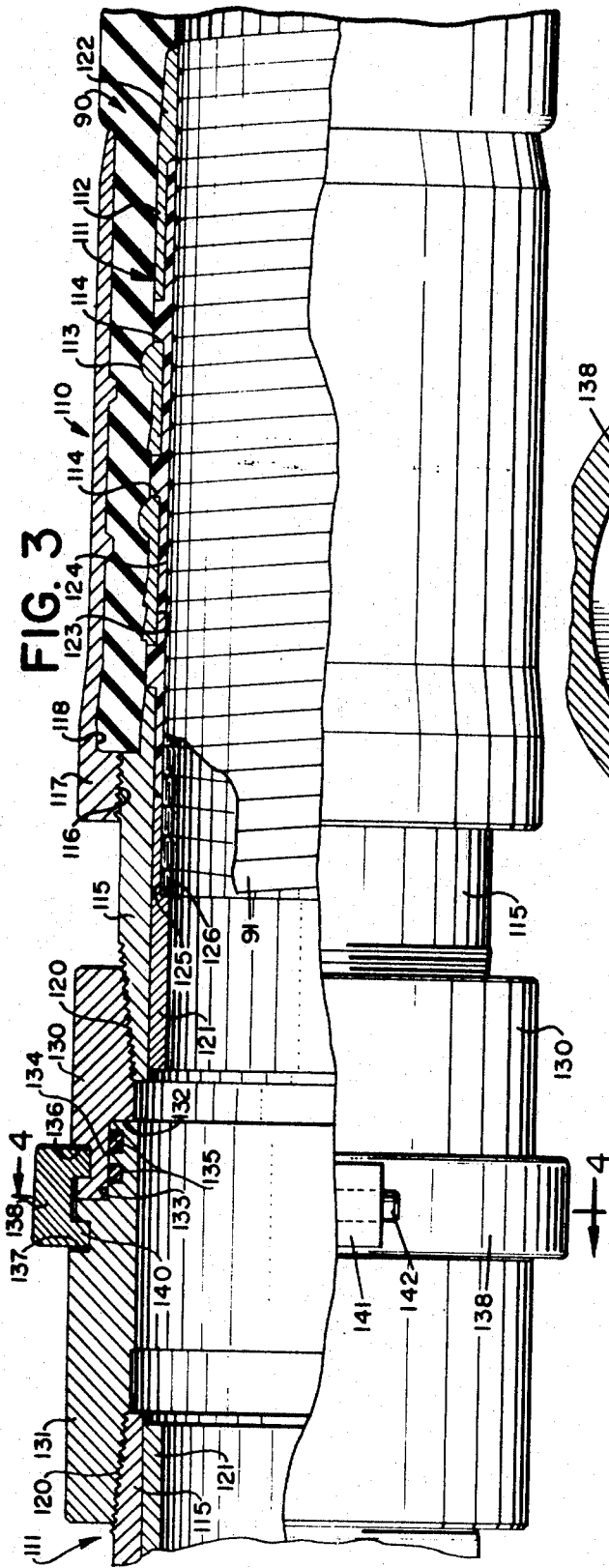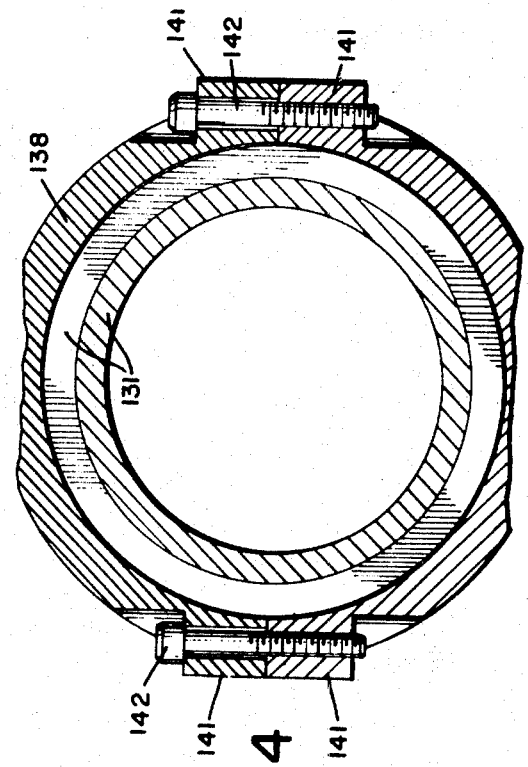

3,712,841
FLEXIBLE HOSE AND METHOD OF MAKING
Clayton H. Skinner, Kenmore, and Paul J. Sick, Buffalo, N.Y., assignors to Litton Systems, Inc.
Original application July 22, 1965, Ser. No. 473,952, now Patent No. 3,420,276, dated Jan. 7, 1969. Divided and this application Feb. 6, 1968, Ser. No. 726,262
Int. Cl. B31c 5/00
U.S. Cl. 156—144          1 Claim

ABSTRACT OF THE DISCLOSURE

The invention relates to the process of making a flexible hose with a built-up body around a tubular metal bore support. The body of the hose made of elastomeric layers and intervening reinforcing layers, is built around the tubular metal bore support, which is flexibly and coherently constructed to serve as a mandrel, and the built-up assembly is then subjected to heat and pressure to cure the elastomeric layers, to consolidate all the layers into a unit and to permanently and inseparably bond the body to the bore support. The invention also relates to a flexible hose made by the process described.

---

The present invention relates to a process of making a flexible hose and to a flexible hose made by said process.

The present application is a division of copending application Ser. No. 473,952, filed July 22, 1965, which has matured into Pat. No. 3,420,276 granted Jan. 7, 1969.

Prior art hose employed for submarine use to convey gaseous material such as oil and gasoline are conventionally a smooth bore ribbon tube with fabric and wire reinforcements to create either a hard wall to resist the external forces to which the hose is subjected or a more flexible hose which will withstand for a short period of time semi-collapse, when the internal pressure is lowered sufficiently. This submarine hose is quite heavy, is somewhat stiff and inflexible due to its extremely heavy carcass, and is quite expensive. Moreover, this hose cannot be manufactured in long lengths and, therefore, is normally made in lengths of about 25 to 30 feet. This hose conventionally has built-in fittings, for coupling, which add to this weight, and where long lengths of hose are required, as for example, about 1000 feet long, it would be impossible to handle the heavy construction this would involve with fittings every 25 to 30 feet, and would be very expensive.

Certain applications now arise requiring transportation of gaseous materials through long lengths of hose under high internal pressure and at the same time submergence of the hose in water of varying depths, so that the hose is subject to varying external pressure depending on the surface contour of the bottom of water in which it is laid. In such a pipe line, various difficult problems are posed as follows:

(1) The hose must be able to resist high internal pressures ranging from 1000 p.s.i. to 3,000 p.s.i.

(2) The hose must be able to withstand high external pressures when pressurized internally, as for example, such external pressures as are created at a depth of 1000 feet, which approximate 500 p.s.i.

(3) The hose must be able to withstand high external pressures with zero internal pressure.

(4) The hose must be highly resistant to elongation.

(5) The hose must be resistant to cover wear under water.

(6) The hose must be resistant to torsion and rolling with the water movement.

(7) The hose must have negative buoyancy empty or filled with product so that it can be submerged out of the path of ships.

(8) The hose must be capable of being easily handled in long length after manufacture, i.e. light enough in weight so that 1000-foot lengths can be reeled for shipping; sufficiently small in outside diameter that normal lanes can handle the size of the unit; sufficiently resistant to kinking that the hose can be reeled off for laying in its application area.

(9) The hose must be sufficiently economical to permit its use for the type of transportation described.

(10) The hose must be so constructed as to permit it to be manufactured in a practical way.

A hose constructed to meet the requirements described conventionally is built on a mandrel and therefore, it is limited in length. The mandrel has been employed to form a bore wire support, if such is used, and to support the inner portion of the hose during building of the hose as well as to provide the necessary pressure by which carcass consolidation and cure is effected. The use of the mandrel limits the lengths of the individual hose sections that can be built.

One object of the present invention is to provide a new and improved method of manufacturing a flexible hose, which is economical and permits the manufacture of longer individual sections than is permitted by methods for making the hose of the wire bore type described, and which produces a hose which is flexible and free from stiff joints that might subject the hose to undue stress, thereby permitting the hose to be reeled and handled in long lengths, as for example, in lengths of 1000 feet or over.

Another object is to provide a new and improved flexible hose made by the method described.

For carrying out the foregoing objectives, the hose, instead of having the bore wire described has a flexible metal bore tube, which although constituting a mandrel on which the hose is built in the manufacture of the hose, forms an integral part of the hose. This flexible bore tube is firm enough to permit the hose to be built thereon, is flexible enough to form an integral part of the hose without materially affecting its flexibility, and is designed and constructed to withstand the heat of vulcanization of the hose itself and withstand the external pressures involved. The structure described can not only be employed for transportation of gaseous liquids under water, but in conjunction with a more simplified superstructure described, can be effectively used for blowing such items as grain, dust and other similar materials in low pressure applications.

The flexible bore tube not only serves the function of a mandrel during manufacture as described, but also, when properly designed, provides the hose with the necessary crush resistant member, thus eliminating the round wire described and at the same time providing the bore-supporting structure performing all the functions of the bore wire described.

The flexible bore tube is desirably a flexible tube made of stainless steel or other suitable material made through the interlocking of successive convolutions of the helixes of ribbons of steel by a winding and swaging or pressing operation, and the interlock is such as to be slightly pervious, permitting thereby permeation of gas therewith, and a hose construction with progressive increase in permeability through the hose as the cover of the hose is approached, as in the case of the bore wire hose. Thus, the hose with a flexible bore tube can be manufactured in long lengths and cured in standard curing vulcanizers to create a hose which meets the requirements listed above.

Various other objects, features and advantages of the present invention are apparent from the following description and from the accompanying drawings, in which FIG. 1 is a view partly in radial section and partly in side elevation of a hose made without a mandrel in accordance with the method of the present invention;

FIG. 3 is a radial section of a coupling which is employed for connecting the individual lengths of hose of the type shown in FIGS. 1 and 2; and FIG. 4 is a section of a coupling taken on lines 4—4 of FIG. 3.

Figure 1:
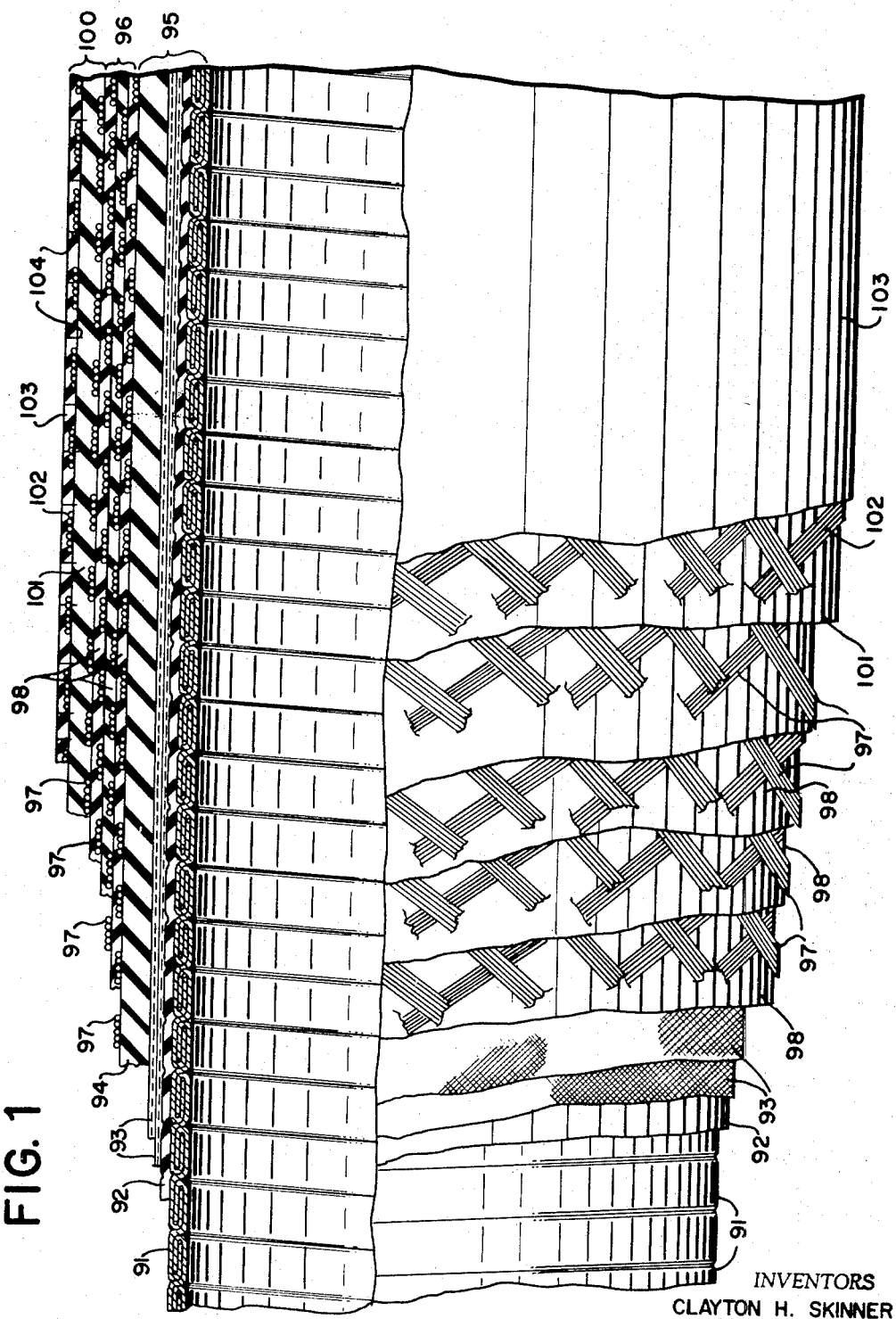

In order to manufacture a hose meeting the requirements of long lengths, it was found desirable to so construct it as to avoid the necessity of using a mandrel, while at the same time providing an internal support for the building of the hose. For that purpose, the hose 90 has a flexible metal peripheral bore suport 91 shown in the form of a flexible bore tube, which is desirably of stainless steel, but which can be constructed from other suitable metals having a composition, or so coated or treated as to render it resistant to the materials to be transported by the hose. The tube 91, which is known, per se, and which is commercially available, is shown comprising a helical ribbon of steel having its convolutions interlocked, swaged or pressed together into a flexible tubular unit or if desired, a number of interleaved helixes of ribbon may be so interlocked, swaged and pressed into a flexible tubular unit. This flexible sheet tube 91 serves as a mandrel during manufacture and is built into the hose to form an inseparable part of the hose. The flexible steel tube 91 also provides the necessary crush resistance, this permitting the elimination of the round wire 23 employed in the hose construction of FIGS. 1 and 1a shown in the aforesaid Pat. 3,420,276.

Over the flexible metal tubing 91 is wrapped a layer 92 of rubber compound, desirably polychloroprene, and over this layer of rubber are two plies 93 of closely woven nylon fabric, each rubber frictioned on both sides. Surrounding these fabric plies 93 is a rubber tube 94, desirably of polychloroprene, to complete the tube part 95 of the hose.

The carcass 96 of the hose 90 consists of multiple reinforcing wire braids 97, four being shown, similar to the wire braids 26, 28 and 30 in the hose construction of FIGS. 1 and 1a shown in the aforesaid Pat. 3,420,276, and separated by intervening layers 98 of rubber compound, desirably polychloroprene.

Over the carcass 96 is a cover 100, comprising a layer 101 of suitable rubber, such as SBR rubber, a textile breaker braid 102 of nylon over said layer 101 and an outside layer 103 of suitable rubber, such as SBR rubber. The outer cover layer 103 is about half the thickness of the inside cover layer 101, so that the textile breaker braid 102 is not embedded approximately half-way between the outer and inner peripheries of the cover 100, as in the hose construction of FIGS. 1 and 1a shown in the aforesaid Pat. 3,420,276 cover 100 is, however, pricked with needles to approximately half-way through the cover to form vent punctures 104 extending through the breaker braid 102 and serving the purpose described in the aforesaid Pat. 3,420,276.

The three sections 95, 96 and 100 of the hose have progressively increasing permeability, the tube section 95 being least permeable, the carcass 96 having greater permeability and the cover 100 having the most permeability, as in the hose construction of FIGS. 1 and 1a shown in the aforesaid Pat. 3,420,276.

The flexible metal interlock of the bore tube 91 renders the tube porous, permitting approximately the same degree of permeation of gas as would occur with the rough bore hose construction of FIGS. 1 and 1a, and provides a bore supporting structure performing all the functions of the bore wire 11 in said construction of FIGS. 1 and 1a.

The hose 90 can be manufactured in long lengths and cured in standard continuous curing vulcanizers, to produce a hose which meets all the requirements listed above. In the process of curing, the different rubber layers are substantially consolidated into an integral rubber unit in which the reinforcing members described are embedded.

Figure 2:
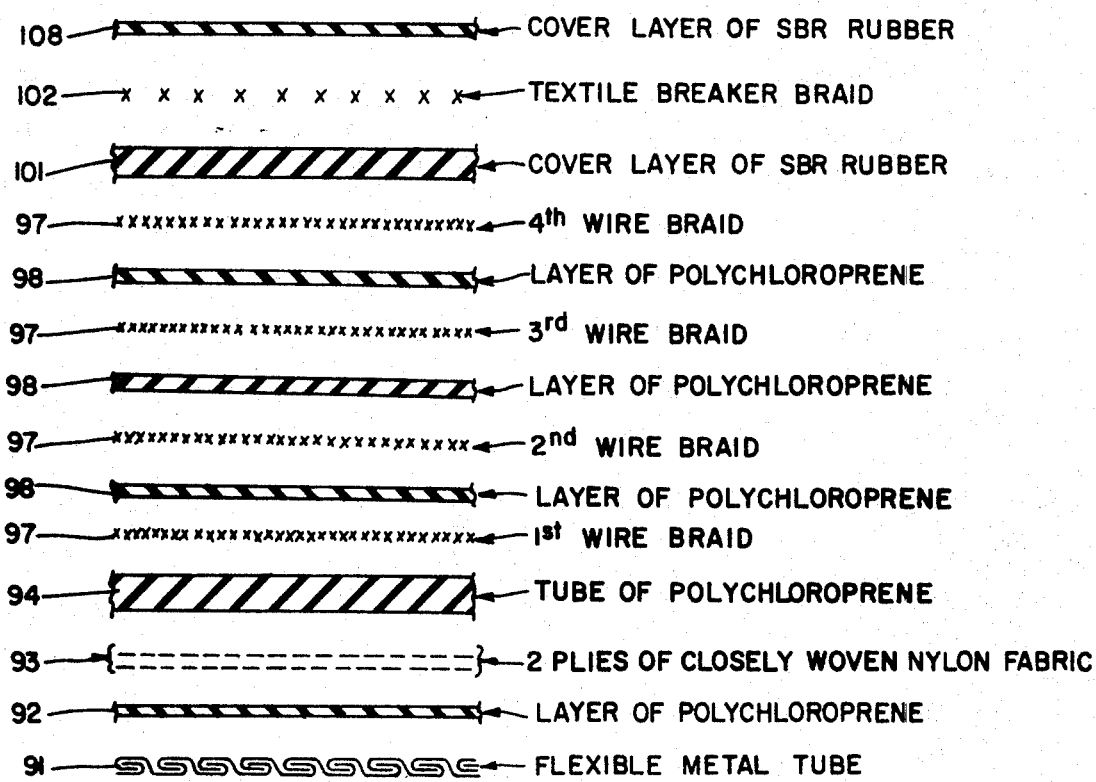
FIG. 2 is a simplified diagram showing schematically the manner and order in which the different components of the hose shown in FIG. 1 are laid in the manufacture of the hose.

Because of the necessity for limiting the hose 90 to a length which will permit convenient handling, shipping and laying, the hose is manufactured to a length of about 1000 feet. These individual lengths must then be coupled in the field and for that purpose, there is provided a new and improved quick connect coupling 110 shown in FIGS. 3 and 4. In connection with this coupling, the hose 90 aside from the flexible bore tube 91, is shown for the sake of simplicity of solid rubber construction, without the other reinforcing components of the hose 90 described. However, it must be understood that the hose 90 to which the coupling 110 is applied would be that shown in FIGS. 1 and 2.

The coupling 110 comprises two similar fittings 111, inseparably attached at the plant to the ends of the hose 90 to be connected together in a manner to be described. Each fitting 111 comprises a tubular shank 112, having an irregular periphery 113 to promote adherence of the hose 90 thereto and having a series of holes 114 to afford adequate adherence of the bore component to this shank, as will be more fully described. Projecting inwardly of the shank 112 is a tubular extension 115 having an internal diameter coextensive with that of the shank and having a thickness greater than that of the shank. The outer end of this extension 115 has an external thread 116 to which is screwed a ferrule 117 forming with the shank 112 an annular chamber 118 for the reception therein of the hose 90, aside from its flexible bore tube 91, and the inner end of this extension 115 has an external thread 120.

Secured to the inside of the tubular extension 115, as for example, by welding, is a tubular lining 121 and the outer end of the shank 112 is enlarged in thickness to define a cam 122, which in conjunction with the end of said lining and the inner periphery of the main body of the shank forms an annular recess 123 for the reception of adhesive 124 to be described more fully. The lining 121 has a peripheral internal recess 125 for the bore tube 91 forming a limiting axially facing annular shoulder 126 for the end of said tube.

For quick coupling the two fittings 111 together in the field, there is provided a female coupling sleeve 130 screwed onto the thread 120 of the tubular extension 115 on one of said fittings, and a male coupling sleeve 131 screwed onto the thread 120 of the tubular extension 115 on the other fitting. The female coupling sleeve 130 has an internal annular recess 132 and the male coupling sleeve 131 has an external annular recess 133, these recesses being designed to permit the two coupling sleeves to conformably interfit when brought together with a stepped juncture 134 in between. O-rings 135 between these coupling sleeves 130 and 131 in this juncture 134 positively seal the juncture against leakage.

The internal and external diameters of the coupling sleeves 130 and 131, when brought together, are substantially the same, so that the internal and external peripheries of these sleeves are substantially cylindrically coextensive, and these sleeves have external annular recesses 136 and 137 respectively. A collar 138 locks the two coupling sleeves 130 and 131 together against axial separation. For that purpose, the collar 138 is of diametrically split construction and has radially inwardly extending flanges 140 at its ends projecting into the sleeve recesses 136 and 137 respectively in locked interfitted position of the coupling sleeves 130 and 131. The collar 138 is provided with bosses 141 secured together by studs 142.

The operation of assembling the coupling 110 is as follows:

At the plant, the end of the flexible metal bore tube 91 of each length of hose 90 of about 1000 feet is passed through the shank 112 of a fitting 111, while the ferrule 117 is off the fitting, until the tube abuts the shoulder 126 of the lining 121. The bore tube 91 is then welded onto the lining 121 at the abutting end of said tube. In the set position of the bore tube 91 described, the dam 122, the shank 112, the outer end of the lining 121 and the outer periphery of the bore tube forms an annular chamber inclusive of the recess 123, which is filled with an adhesive 124, desirably an epoxy resin, as for example, one available under the name Hysol, through the filler holes 114. The rest of the hose is then built over the shank 112 in the manner described. After the hose has been completed over the shank 112 and the hose is cured, the ferrule 117 is screwed onto the threads 116 and the ferrule and the shank are swaged over the hose at prescribed pressures to assure the end pull resistance characteristics necessary to meet requirements.

The assembly described can then be coupled to another similar assembly in the field through the coupling sleeves 130 and 131 and the locking collar 138. After coupling, the entire coupled assembly can be covered with a thermoplastic tape, which is then heat-sealed onto the assembly to form a conforming protective covering.

While the invention has been described with particular reference to a specific embodiment, it is to be understood that it is not to be limited thereto but is to be construed broadly and restricted solely by the scope of the appended claim.

What is claimed is:

1. The method of producing a flexible hose, which comprises firmly applying a plurality of concentric laminating annular layers of elastomeric material curable under heat and one or more annular layers of reinforcing material around a tubular metal bore support having successive sections therealong flexibly and spirally interconnected to form around said bore support a built-up hose body comprising (1) a tube on its inner periphery having one of said elastomeric layers around said support, (2) an annular carcass around said tube having one or more of said elastomeric layers and one or more of said reinforcing layers, and (3) an annular cover around said carcass having near the outside of the cover one of said elastomeric layers, said bore support being firm enough, strong enough and coherent enough to withstand the radially inward pressure of said layers thereon during the build-up of said body and to serve as a mandrel during said body build-up, said body build-up being carried out in the absence of a mandrel aside from said metal bore support, and subjecting said hose body to curing heat and radially inward external pressure while said body embraces said bore support, to consolidate substantially different layers of said body together into an integral elastomeric unit with the reinforcing layers embedded in said elastomeric unit and to permanently, inseparably and firmly bond said body to said bore support.

References Cited

UNITED STATES PATENTS

| | | | |
|---|---|---|---|
| 1,838,056 | 12/1931 | Harpfer | 138—130 |
| 3,073,351 | 1/1963 | Nichols | 138—144 |
| 3,245,852 | 4/1966 | Martin et al. | 156—143 |

CARLTON R. CROYLE, Primary Examiner

R. J. SHER, Assistant Examiner

U.S. Cl. X.R.

156—188, 303.1